United States Patent
Schön (10) Patent No.: US 11,208,894 B2
(45) Date of Patent: Dec. 28, 2021

(54) TURBINE WHEEL

(71) Applicant: BorgWarner Inc., Auburn Hills, MI (US)

(72) Inventor: Martin Schön, Fürfeld (DE)

(73) Assignee: BorgWarner Inc., Auburn Hills, MI (US)

( * ) Notice: Subject to any disclaimer, the term of this patent is extended or adjusted under 35 U.S.C. 154(b) by 125 days.

(21) Appl. No.: 16/597,912

(22) Filed: Oct. 10, 2019

(65) Prior Publication Data
US 2020/0116026 A1 Apr. 16, 2020

(30) Foreign Application Priority Data
Oct. 11, 2018 (EP) ..................... 18199842

(51) Int. Cl.
*F01D 5/14* (2006.01)

(52) U.S. Cl.
CPC .......... *F01D 5/141* (2013.01); *F05D 2220/40* (2013.01); *F05D 2250/71* (2013.01)

(58) Field of Classification Search
CPC ... F01D 5/141; F01D 5/04; F01D 5/34; F01D 9/041; F05D 2220/40; F05D 2250/71; F05D 2250/00; F02C 6/12; F04D 29/30; Y02T 10/12
See application file for complete search history.

(56) References Cited

U.S. PATENT DOCUMENTS

| | | | |
|---|---|---|---|
| 2015/0086396 A1* | 3/2015 | Nasir | F01D 17/165 417/407 |
| 2016/0238019 A1 | 8/2016 | Kobayashi et al. | |
| 2017/0292381 A1 | 10/2017 | Ishii | |

FOREIGN PATENT DOCUMENTS

| | | |
|---|---|---|
| DE | 112015004058 T5 | 6/2017 |
| DE | 102016102732 A1 | 8/2017 |
| DE | 102016220133 A1 | 4/2018 |
| EP | 1828543 A1 | 9/2007 |

(Continued)

OTHER PUBLICATIONS

Machine-Assisted English language abstract for DE 11 2015 004 058 extracted from espacenet.com database on Oct. 21, 2019, 2 pages.

(Continued)

*Primary Examiner* — Jacob M Amick
*Assistant Examiner* — Charles J Brauch
(74) *Attorney, Agent, or Firm* — Howard & Howard Attorneys PLLC (57) ABSTRACT

A turbine wheel, in particular in a charging device for use in an internal combustion engine, is specified, wherein the turbine wheel (10) comprises a plurality of blades (12) on a hub (16) that forms a rear wall (14), wherein adjacent blades (12) form an inlet surface (18) having two leading edges (20) and an outlet surface (22) having two trailing edges (24) and situated substantially axially inward, wherein a surface (26) of a blade (12) is configurable by way of an angle (T) and a length (Z0) of a plurality of curvatures (30, . . . , 38) situated next to one another between the leading edge (20) and the trailing edge (24), wherein, for each of the curvatures (30, . . . , 38), the angle (T) of the leading edge (20) initially increases or remains constant and then decreases as the length (Z0) increases so as to form a maximum (40, 40', 40").

12 Claims, 6 Drawing Sheets

(56) References Cited

FOREIGN PATENT DOCUMENTS

EP          2447473  A1    5/2012
JP         H11190201 A     7/1999
WO       2006067359 A1     6/2006

OTHER PUBLICATIONS

Machine-Assisted English language abstract and Machine-Assisted English language translation for DE 10 2016 102 732 extracted from espacenet.com database on Oct. 21, 2019, 12 pages.
Machine-Assisted English language abstract and Machine-Assisted English language translation for DE 10 2016 220 133 extracted from espacenet.com database on Oct. 21, 2019, 9 pages.
English language abstract and Machine-Assisted English language translation for JPH 11-190201 extracted from espacenet.com database on Oct. 21, 2019, 5 pages.

* cited by examiner

TURBINE WHEEL

CROSS-REFERENCE TO RELATED APPLICATIONS

This application claims the benefit of European Priority Patent Application No. 18199842.8 filed Oct. 11, 2018, the disclosure of which is herein incorporated by reference in its entirety.

The invention concerns a turbine wheel, in particular in a charging device for use in an internal combustion engine.

Charging devices in the form of exhaust gas turbochargers in which a turbine wheel drives a compressor wheel of a compressor are known in the broader prior art. The turbine and the compressor wheel are arranged on a common rotor, which is rotatably supported in a bearing housing. The turbine wheel is driven by an exhaust gas flow. The compressor is arranged in the intake air manifold of an internal combustion engine.

In charging devices of this kind, the compressor wheel is driven by means of the turbine wheel, in which case the design of the turbine wheel, in particular with respect to the geometry of the blade wheel, is able to influence the output of the charging device.

One example of a turbine wheel is known from EP 1 828 543 A1. The turbine wheel described therein comprises a hub, a plurality of blades, and a backplate. Several of the blades comprise an exducer portion with a rear edge and an inducer portion with a front edge. The inducer has positive local blade angles along the front edge (with respect to the intended direction of rotation of the turbine wheel), the degrees of which increase from a point on the front edge near a shroud end to a point on the rear edge near a backplate end.

It is disclosed in JP-H 11 190 201 A that engine exhaust gas in a turbine housing flows into a turbine wheel through a volute. At the design point, a relative inflow angle of the exhaust gas matches an inlet blade angle to the wheel, with the result that the exhaust gas flows uniformly along a wheel blade. Away from the design point, there is a difference between the relative inflow angle and the inlet blade angle. If a flow at the front edge of the wheel runs at a large angle of incidence, then an eddy originating from an exposed portion with a backswept angle is a helical, vertical eddy which runs parallel to the flow, in which case a central axis is situated parallel to the flow.

On the basis of this prior art, the object of the invention is then to provide a turbine wheel, in particular in a charging device for use in an internal combustion engine, which makes it possible to further improve the efficiency of the charging device when it is operated in the internal combustion engine.

This object is achieved by way of the independent claims. Further preferential embodiments of the invention are the subject-matter of the dependent claims. These claims may be combined with one another in a technically useful manner. The description, in particular within the context of the drawings, further characterizes and specifies the invention.

According to the invention, a turbine wheel, in particular in a charging device for use in an internal combustion engine, is provided, wherein the turbine wheel comprises a plurality of blades on a hub that forms a rear wall, wherein adjacent blades form an inlet surface having two leading edges and an outlet surface having two trailing edges and situated substantially axially inward, wherein a surface of a blade is configurable by way of an angle and a length of a plurality of curvatures situated next to one another between the leading edge and the trailing edge, wherein, for each of the curvatures, the angle of the leading edge initially increases or remains constant and then decreases as the length increases so as to form a maximum.

According to the invention, a turbine wheel is therefore specified, the blade surfaces of which are configured by way of a plurality of curvatures that are situated next to one another. In this context, the curvatures are described in a coordinate system based on the wheel and consisting of an angle and a length, with the characteristic feature being the formation of a maximum. In this case, the length follows a path between the inlet surface and the outlet surface in order to achieve an acceleration during operation of the turbine wheel by means of the blades thus formed, e.g., in a charging device in an internal combustion engine, said acceleration being shifted closer towards the outlet surface as compared to the prior art. This geometry of the turbine wheels according to the invention causes a reduction in the moment of inertia thereof, which enables a faster acceleration during the run-up of an internal combustion engine. Moreover, doing so improves the level of thermodynamic efficiency of the turbine wheel according to the invention able to be achieved, particularly during interaction with additional components in an arrangement having variable turbine geometry.

According to one embodiment of the invention, the angles are formed as polar angles, and the lengths are formed along an axis of rotation around a direction of rotation.

According to this approach, the coordinate system based on the wheel is, in a manner commonly used in this field, formed from a polar angle and a length along an axis of rotation around a direction of rotation of the turbine wheel. A representation of this kind is common in the field of turbine wheels, so a straightforward comparison with turbine wheels from the prior art is thus possible.

A zero point for the angle can be chosen to increase along the leading edge towards the direction of rotation In addition, the length can be normalized along the axis of rotation.

The latter approach also relates to a measure commonly used in this field, the result being that a comparison with respect to characteristic features is possible for variously shaped blades in particular, in which context, for example, the associated angle always begins at the zero point regardless of the actual starting point of a curvature. Since the path along the curvatures between the inlet surface and the outlet surface is normally of varying length, it is useful to normalize the length. In addition, an alternative representation can be calculated from an associated metal angle, which is calculated as the differential of the angle defined above and a meridional trajectory.

According to a further embodiment of the invention, a plurality of curvatures are formed to begin at the transition between the blade and the hub and continue until an outer edge of the blade. Said plurality of curvatures can in this case be chosen to be spaced at equal distances. Moreover, the plurality of curvatures can be placed in the center of the blade.

Therefore, a group of curvatures made up of a plurality of curvatures, each of which begins on a leading edge and leads to a trailing edge, is created in order to configure the surface of the blade. The region relevant to the thermodynamic properties of the turbine wheel is located between the leading edge and the trailing edge, so it is sufficient to characterize the surface of a blade between these points. By being spaced at equal distances, the individual curvatures can, for example, begin as starting points at values of 0%, 25%, 50%, 75%, and 100% of the length of the leading edge and end at corresponding points on the trailing edges. The curvature situated at 0% of the leading edge is often referred to as the hub section in this context, whereas the curvature beginning at 100% of the leading edge can be referred to as the outer section. In this case, the curvatures are placed in the center of the blade, between the suction side and the pressure side.

According to a further embodiment of the invention, the angle of the associated curvature initially increases at the transition between the blade and the hub, has its maximum in the region of 40% to 50% of the length, and then decreases.

The so-called hub section is characterized in greater detail in this embodiment, with one feature of the embodiment according to the invention in this case consisting of the maximum of the associated curvature having a maximum (with respect to the angle) in the region of 40% to 50% of the length between the inlet surface and the outlet surface. Turbine wheels according to the prior art typically do not have a maximum or continuously decrease across the entire length of the region with respect to the angle.

According to a further embodiment of the invention, the angles of the curvatures situated between the curvature at the transition and the curvature at the outer edge have less pronounced maxima than the maximum. The angles of the associated curvatures can in this case have a respective maximum in the region of 20% to 40% of the length. The maxima for adjacent curvatures can transition into a plateau in the direction of the outer edge. This embodiment is based on the associated curvatures between the hub section and the outer section, i.e., those curvatures which are, for example, located as a starting point or end point in the region of 25% to 75% of the length of the leading or trailing edge. In comparison to the curvature of the hub section, a maximum is likewise formed in this case, but it turns out to be significantly less pronounced, i.e., the maximal angle of the maximum has a lower value. Moreover, the maximum is also shifted towards smaller length values or, in the case of curvatures situated farther outwards (for example, given a starting point for the curvature at 75% of the leading edge), gradually transitions into a plateau.

In another variation, the angles of the curvatures situated between the curvature at the transition and the curvature at the outer edge can each have a maximum in the form of a plateau.

Instead of the embodiment with a maximum just described, the curvatures between the hub section and the outer section can also be formed without discernible extreme values, with the result that the maximum in each case is in the form of a plateau.

According to a further embodiment of the invention, the angle of the associated curvature remains constant or nearly constant along the outer edge of the blade in the region of up to 20% of the length, and then decreases so as to form the associated maximum in the shape of a plateau.

The so-called outer section, i.e., the curvature in the region of the outer edge of the blade, is described in greater detail in this embodiment. Typically, instead of an embodiment with an extreme value being the case, the maximum in this case is designed as a plateau up to a length of approximately 20% and then decreasing.

In this case, the angles of the associated curvature along the outer edge of the blade can have a maximum in the region of less than 5% of the length.

In other variations, however, an embodiment is conceivable in which the angle along the outer wheel has an extreme value that forms a maximum at very small lengths, typically of several percent of the length. However, this maximum typically measures only several degrees.

According to the invention, a charging device with variable turbine geometry for use in an internal combustion engine is also provided, said charging device comprising a bearing housing on a shaft, a compressor wheel, and a turbine wheel that drives the compressor wheel in an arrangement with variable turbine geometry, wherein the turbine wheel comprises a plurality of blades on a hub that forms a rear wall, wherein adjacent blades form an inlet surface having two leading edges and an outlet surface having two trailing edges and situated substantially axially inward, wherein a surface of a blade is configurable by way of an angle and a length of a plurality of curvatures situated next to one another between the leading edge and the trailing edge, wherein, for each of the curvatures, the angle of the leading edge initially increases or remains constant and then decreases as the length increases so as to form a maximum.

The characteristic arrangement of the turbine wheel makes it possible to accelerate the gases flowing through the turbine wheel in a charging device in a relatively delayed manner, thus resulting in an increase in the efficiency of the charging device by virtue of the reduced moment of inertia of the turbine wheel and by virtue of an improvement in the level of thermodynamic efficiency.

Several exemplary embodiments are explained in greater detail hereinafter with reference to the drawings. Shown are.

In the drawings, equal or functionally equal components are provided with the same reference signs.

Figure 1:
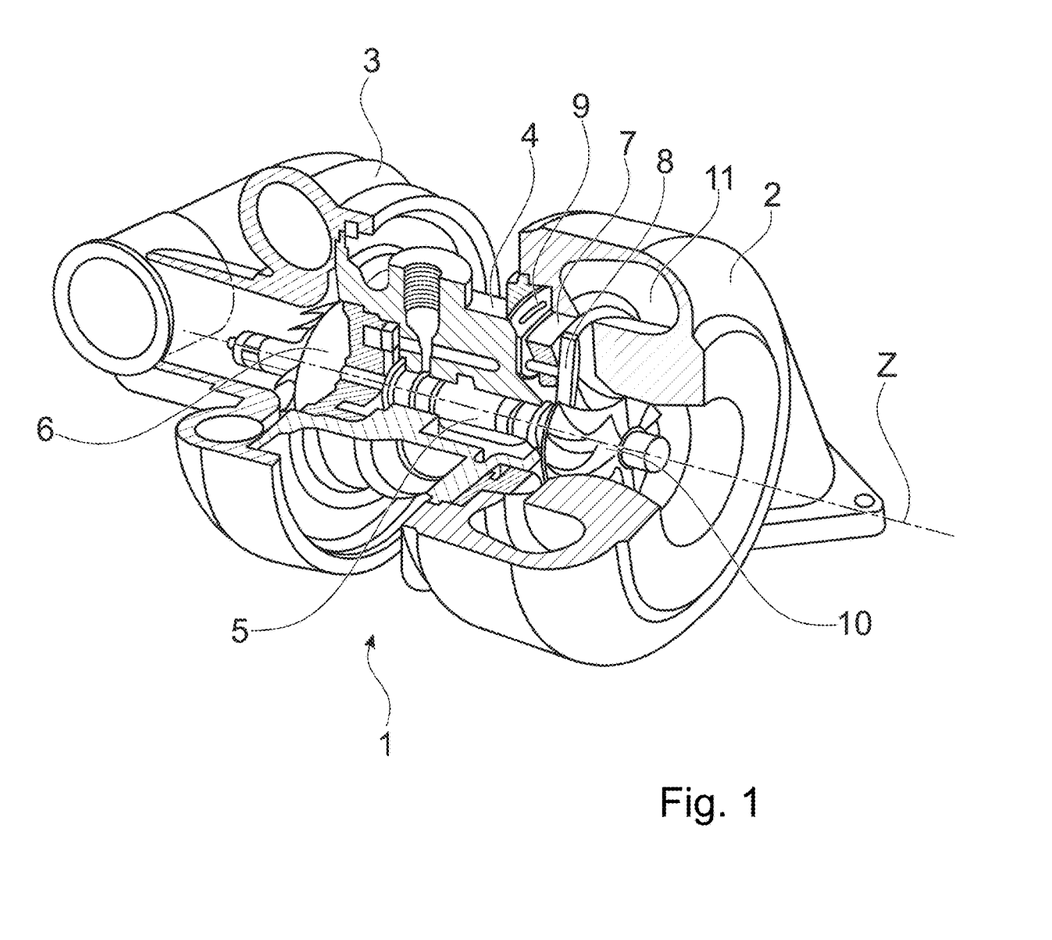
FIG. 1 a partial sectional view schematically showing a charging device for use in an internal combustion engine.

To begin with, schematically described hereinafter with reference to FIG. 1 is a charging device 1, in which an embodiment of a turbine wheel according to the invention is preferably able to be used. In this context, FIG. 1 merely shows a roughly sketched sectional view of the charging device 1 in order to be able to represent the positions of the individual components. Charging devices 1 of this kind are known per se from the prior art.

FIG. 1 shows a cross-section of a partial perspective view of a charging device 1 according to the invention. The charging device 1 comprises a turbine housing 2 and a compressor housing 3 connected thereto via a bearing housing 4. The turbine housing 2, the compressor housing 3, and the bearing housing 4 are arranged along an axis Z. The turbine housing 2 is shown in partial cross-section. The shaft 5 in this case connects a turbine wheel 10 to a compressor wheel 6. Arranged on the turbine side by means of a vane bearing ring 7 is a variable turbine geometry system, which comprises a plurality of adjustable vanes 8 with corresponding axes of rotation and distributed along the circumference. Formed thereby are nozzle cross-sections which, depending on the position of the adjustable vanes 8, are larger or smaller and which to a greater or lesser degree apply engine exhaust gas fed through a feed channel 11 and discharged via a central nozzle to the turbine wheel 10 situated in the center of axis Z in order to drive the compressor wheel 6 via the turbine wheel 10. Provided in order to control the movement, or rather the position, of the adjustable vanes 8 is an actuating means or an actuator which can, for example, be designed as an electrical actuator or a pneumatic actuator. The actuating means can set an adjustment ring 9 situated behind the vane bearing ring 7 into a slight rotational motion.

It is self-evident that charging devices 1 such as the one schematically illustrated in FIG. 1 will comprise yet further components in order to be usable in an internal combustion engine. A charging device 1 of this kind is referred to as a VTG turbocharger. The embodiment of the turbine wheel 10 according to the invention that can be used in the charging device 1 is then described hereinafter in greater detail.

Figure 2:
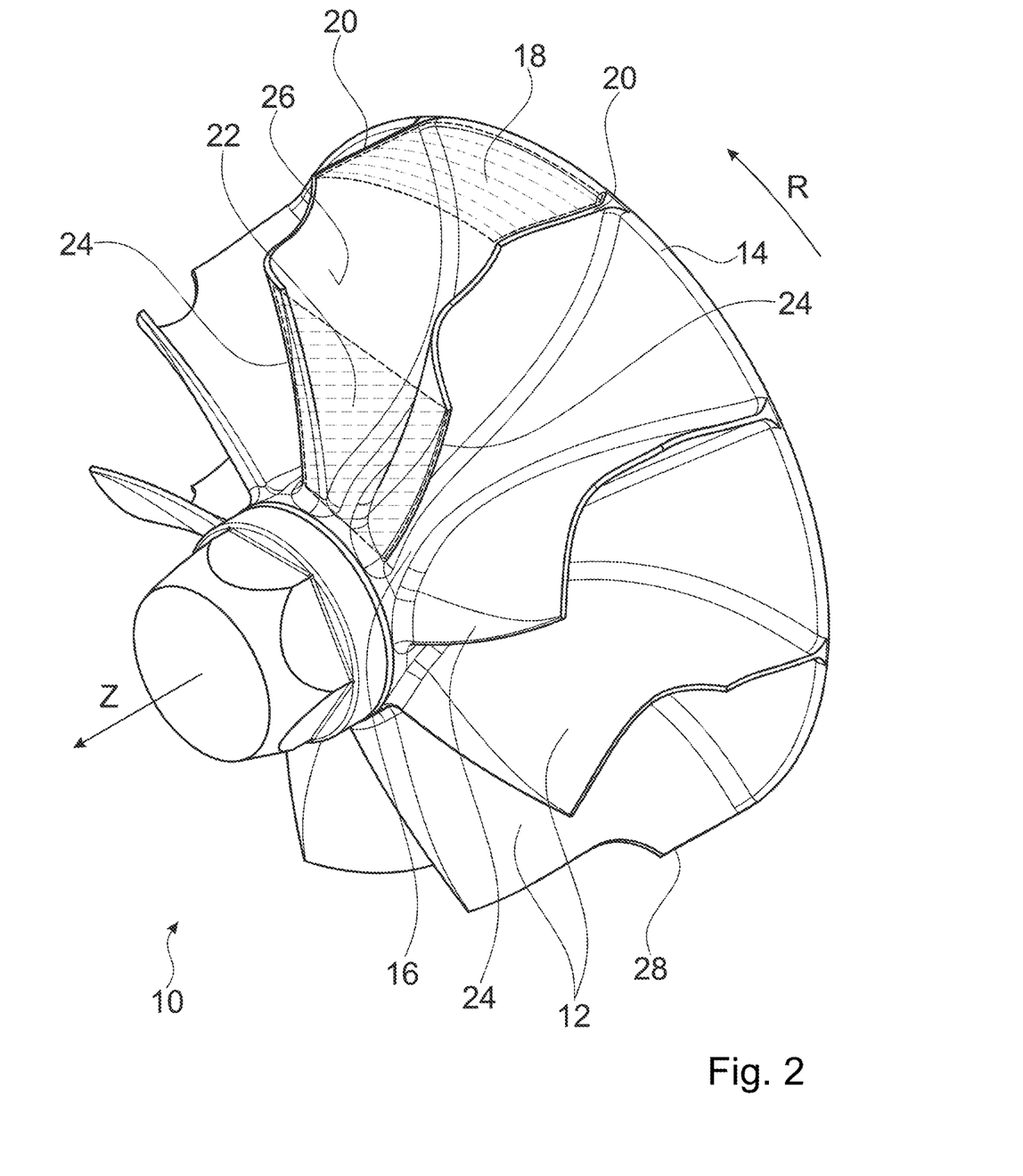
FIG. 2 a perspective side view of a turbine wheel according to one embodiment of the invention, FIG. 3 a plan view of the turbine wheel from FIG. 2 together with a coordinate system, FIG. 4 a side view of the turbine wheel from FIG. 2 together with a turbine wheel according to the prior art.

Illustrated in FIG. 2 is a perspective side view of the turbine wheel 10. It is evident that the turbine wheel 10 preferably comprises blades 12 spaced at equal distances and arranged on a hub 16 that forms a rear wall 14. Formed between adjacent blades 12 is an inlet surface 18, which is adjoined by two leading edges 20. The inlet surface 18 is in this case arranged on the radially outward circumferential side. Also provided is an outlet surface 22, which is situated substantially axially inward and is formed between two trailing edges 24 of adjacent blades 12.

As a result, gas flows in the turbine wheel 10 from the inlet surface 18 to the outlet surface 22, with the surfaces 26 of the blades 12 being chosen so that the gas is able to undergo an acceleration between the inlet surface 18 and the outlet surface 22, with the result that the turbine wheel 10 is set into a slight rotational motion, which is referred to in FIG. 2 as the direction of rotation R. The area of a blade 12 that is defined by the rear wall 14 across to the leading edge 20 and the trailing edge 24 towards the end of the hub 16 is referred to in the following examples as the outer edge 28.

According to the invention, the embodiment of the surface 26 of the blade 12 is chosen such that, in comparison to the turbine wheels from the prior art, a further improvement is achieved with respect to mass inertia and the degree of thermodynamic efficiency. The explanation of the embodiment according to the invention can in this case take place in a variety of ways. On the one hand, an attempt could be made to represent a meridional progression between the inlet surface 18 and the outlet surface 22 with respect to the thermodynamically active surfaces in order to be able to describe the acceleration of the gases. However, the advantageous effect of the embodiment of the turbine wheel 10 according to the invention can only be undertaken with difficulty because, depending on the pressure conditions or rotational speeds present, other thermodynamic conditions might take place.

Figure 3:
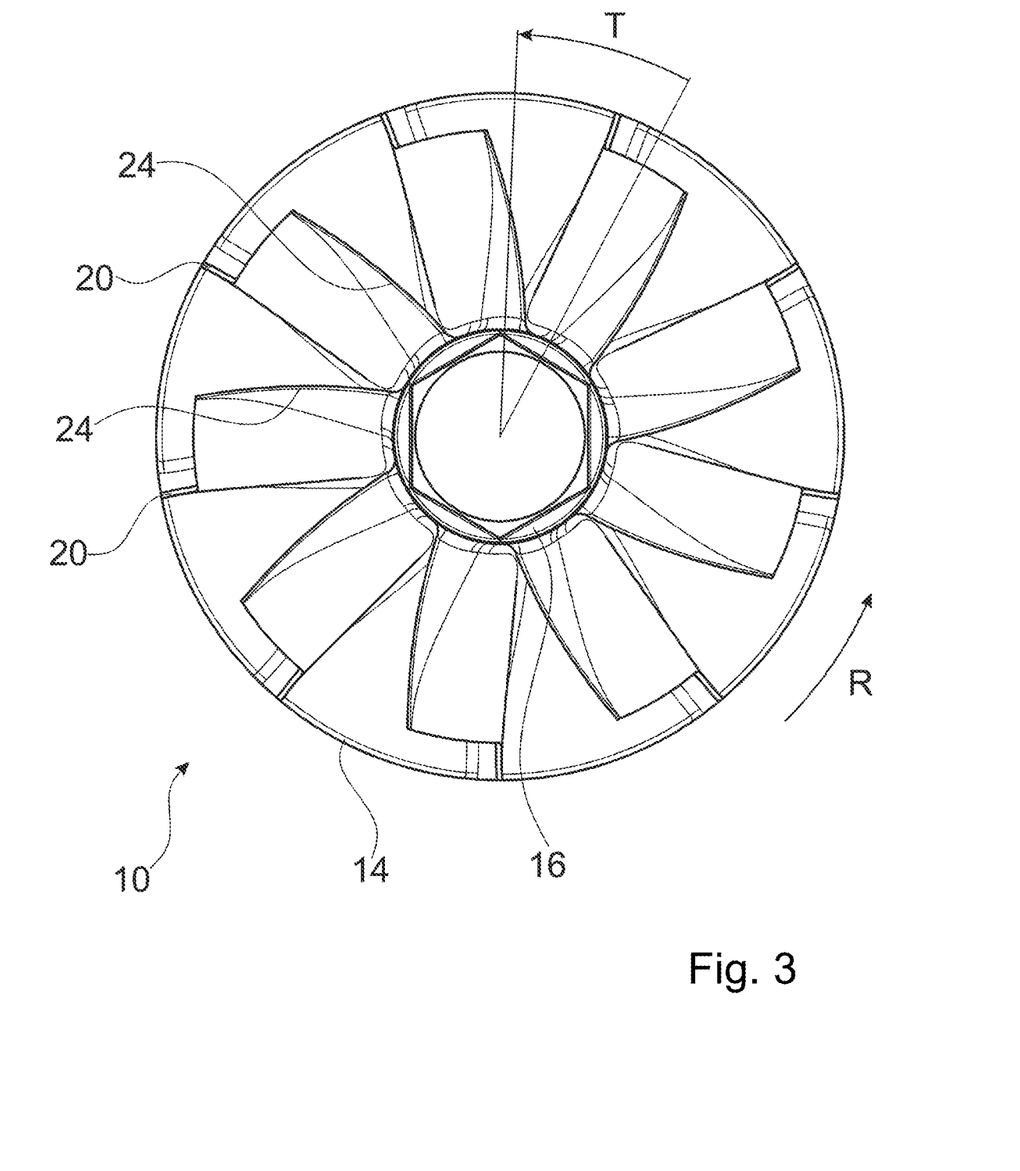

As a result, another approach has been chosen with reference to FIG. 3. The turbine 10 is associated with a stationary coordinate system, with a representation similar to a polar coordinate system having been selected in this case. In this context, an angle T (theta) is chosen to increase towards the direction of rotation R, while various starting values along the leading edge 20 are chosen to describe the contour. The angle T is in each case set to zero at each of these starting points along the leading edge 20. In some applied cases, a metal angle is also derived from the angle T, thus enabling a contextual relationship with the surface contour of a blade 12 to be determined regardless of the thermodynamic conditions actually present.

For the sake of completeness, it should also be mentioned that the contour of the blade 12 on the surface 26 is not precisely specified. It has proven to be advantageous to choose the blade center as a reference plane. The blade center can also be referred to as the center of the suction side and the pressure side.

The contour lines along the blade 12 towards the axis of rotation are referred to hereinafter as the direction Z, said lines in each case being normalized because, depending on the starting point on the leading edge 20 or the end point on the trailing edge 24 chosen, a variety of contour line lengths can result. It should be mentioned that a representation of this kind is common in the field of turbine wheels, within which context the aforementioned U.S. document adopts a similar approach.

Figure 4:
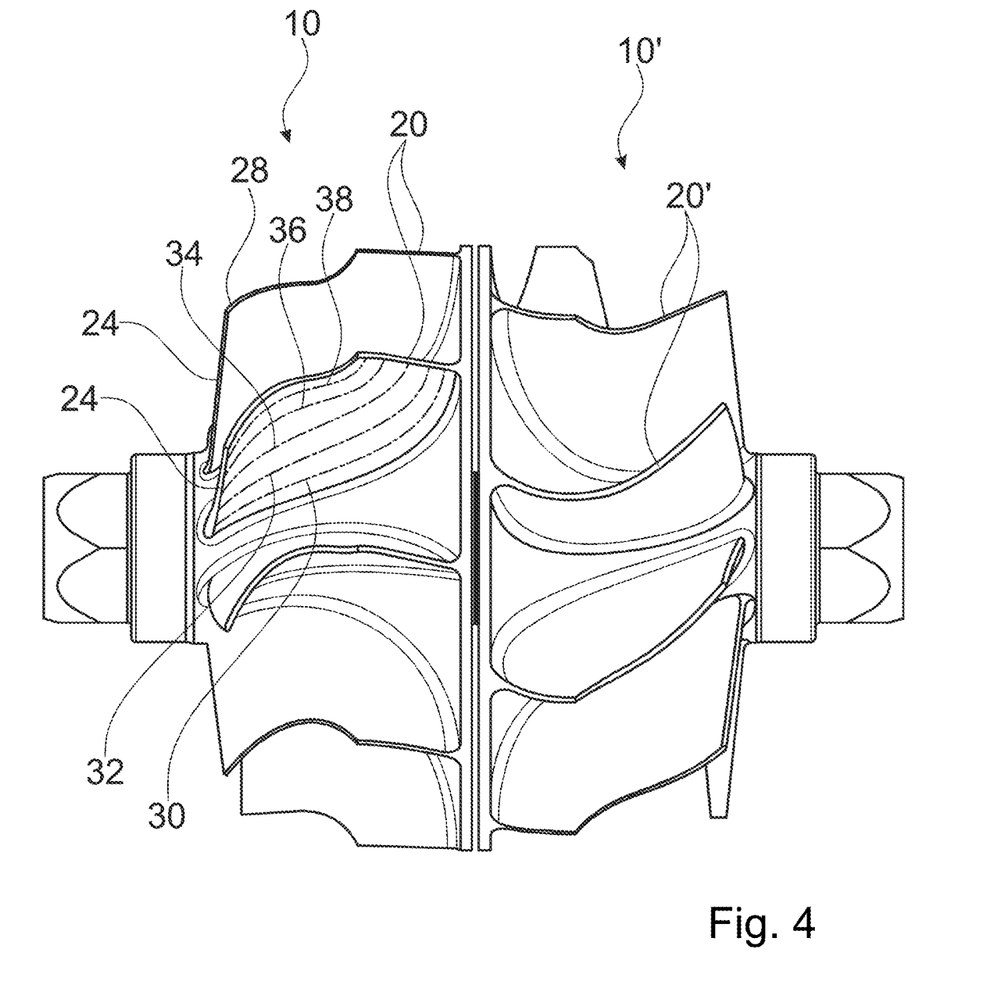

FIG. 4 then shows a side view of the turbine wheel 10, in which various contour lines have in this case been drawn as curvatures 30, 32, 34, 36, and 38. The first curvature 30 is in this case chosen at the transition between the blade 12 and the hub 16. The additional curvatures 32, 34, and 36 are thereby spaced at equal distances, with starting points and end points situated farther inward having in each case been chosen along the leading edge 20 or the trailing edge 24. In this case, the fifth curvature 38 follows the outer edge 28 of the blade 12. Using the group of curvatures 30, 32, 34, 36, and 38 shown, it is then possible to describe the contour of a blade 12. It should be mentioned again at this juncture that the curvatures 30-38 shown are typically indicated in the center of the blade.

The progress of the angle T across the normalized z-direction Z0 is then drawn in FIGS. 5A to 5E as a curvature regarding each of the curvatures 30-38 described above. The curvatures drawn using dashed lines correspond in this case to a surface contour as would be attained using a turbine wheel from the prior art. Determining the parameters of the angle T along the direction Z0 thus takes place in an identical manner, with a further turbine wheel 10' having been drawn in FIG. 4 to compare the blade geometries. The latter is illustrated immediately adjacent (rear wall to rear wall) to a turbine wheel 10 according to the invention for comparison. The comparative example would have no maximum with respect to the curvatures described above, so it follows a course such as that illustrated in FIGS. 5A to 5E by way of the curvatures drawn using dashed lines. The shape of the leading edge 20' of the turbine wheel 10' according to FIG. 4 is noticeably different.

Figure 5A:
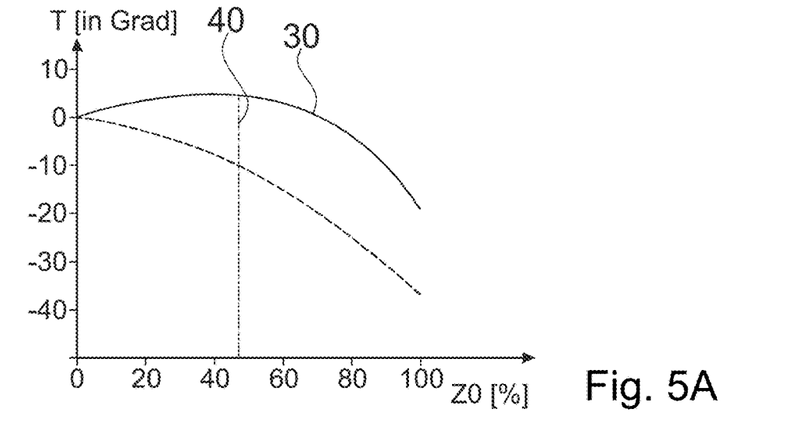
FIGS. 5A-E are each diagrams used to describe a turbine wheel according to the invention.

In the region of the transition between the blade 12 and the hub 16, the angle T of the leading edge 20 initially increases as the length Z0 of the curvature 30 increases so as to form a maximum 40, as shown in FIG. 5A. The degree of the angle T subsequently decreases as the length Z0 then decreases.

Figure 5B:
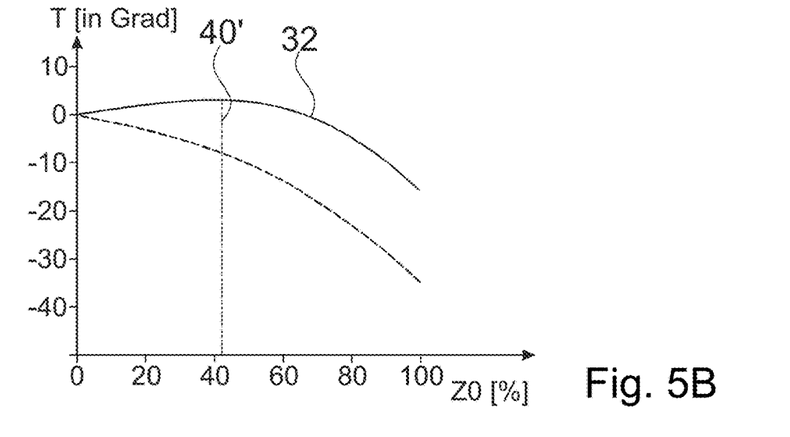
Figure 5C:
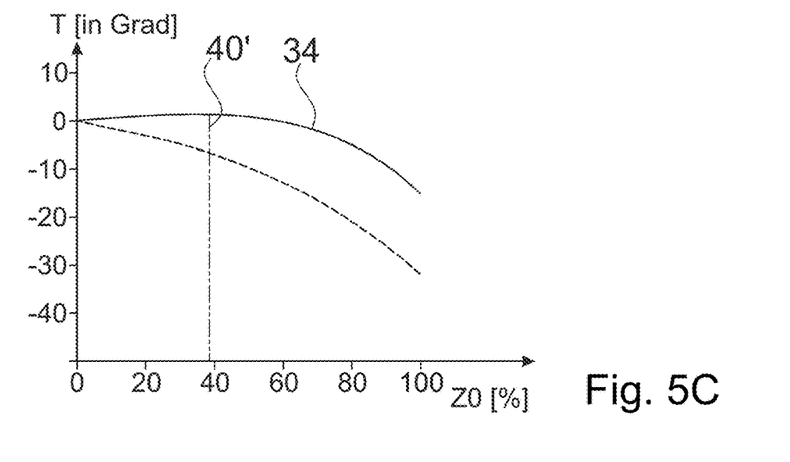
Figure 5D:
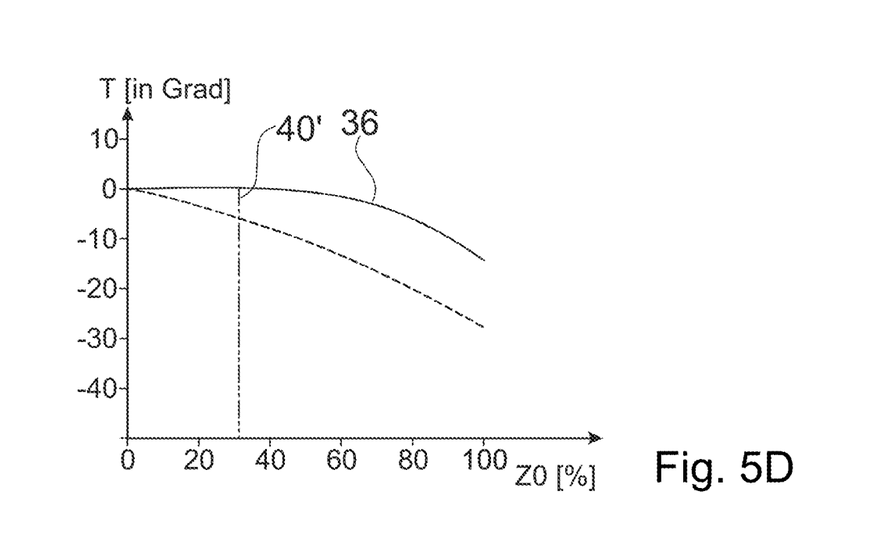

According to the illustration shown in FIGS. 5B to 5D, a maximum 40' is likewise formed for the curvatures 32, 34, and 36 spaced farther from the transition between the blade 12 and the hub 16, in which case this maximum is less pronounced, or is rather shifted toward smaller length values Z0, for curvatures situated closer to the outer edge 28.

Figure 5E:
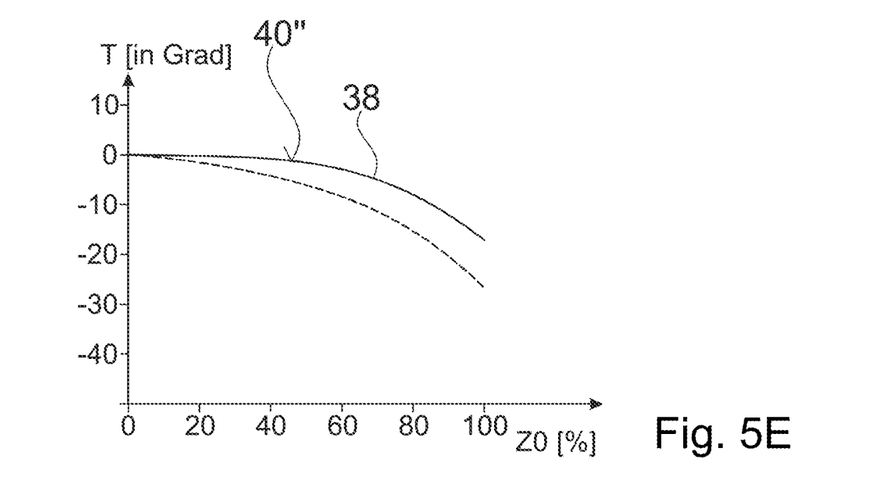

Only a kind of plateau 40" is formed for the last curvature 38 illustrated in FIG. 5E, with the result that the angle T initially remains constant and then decreases as the length $z_0$ increases. In this description, the term "plateau" is not simply understood to mean an exactly horizontal course for the angle T, because deviations from the angle T of up to several degrees may also arise.

In this case, the maximum 40 for the first curvature 30 is formed in the region of 40% to 50% of the length Z0. The maxima 40' for curvatures 32, 34, and 36 are typically situated in a region from 20% to 40% of the length Z0. In other embodiments, however, a progression having a plateau can (as shown in FIG. 5E with regard to curvature 38) actually also exist for curvature 36 or curvature 34 and curvature 36 as well as for all curvatures 32, 34, and 36.

The arrangement according to invention of the blades 12 enables a reduction in the mass inertia of the turbine wheel 10 because the shape thereof is determined by the relatively delayed acceleration of the gas flow in relation to the meridional trajectory of said flow. Use of the turbine wheel 10 according to the invention in the charging device 1 reduces the mass inertia of the latter, thus resulting in faster acceleration during the run-up of an internal combustion engine. As a result, the level of thermodynamic efficiency of the turbine wheel 10 according to the invention in the charging device 1 is also improved, particularly that able to be achieved during interaction with additional components in an arrangement having variable turbine geometry.

The features specified hereinabove and in the claims as well as those able to be gathered from the drawings are able to be implemented in an advantageous manner both individually and in various combinations. The invention is not restricted to the embodiments described, but is rather able to be modified in a number of ways within the scope of expertise of a skilled person.

LIST OF REFERENCE SIGNS

1 Charging device
2 Turbine housing
3 Compressor housing
4 Bearing housing
5 Shaft
6 Compressor wheel
7 Vane bearing ring
8 Adjustable vanes
9 Adjustment ring
10, 10' Turbine wheel
11 Feed channel
12 Blade
14 Rear wall
16 Hub
18 Inlet surface
20, 20' Leading edge
22 Outlet surface
24 Trailing edge
26 Surface
28 Outer edge
30-38 Curvature
40 Maximum
40' Maximum
40" Maximum

The invention claimed is:

1. A turbine wheel, in particular in a charging device for use in an internal combustion engine, wherein the turbine wheel (10) comprises a plurality of blades (12) on a hub (16) that forms a rear wall (14), wherein adjacent blades (12) form an inlet surface (18) having two leading edges (20) and an outlet surface (22) having two trailing edges (24) and situated substantially axially inward, wherein a surface (26) of a blade (12) is configurable by way of an angle (T) and a length (Z0) of a plurality of curvatures (30, ..., 38) situated next to one another between the leading edge (20) and the trailing edge (24), wherein, for each of the curvatures (30, ..., 38), the angle (T) of the leading edge (20) initially increases or remains constant and then decreases as the length (Z0) increases so as to form a maximum (40, 40', 40"), the angle (T) being formed as a polar angle and the length being formed along an axis of rotation (Z) around a direction of rotation (R), a zero point of the angle (T) being chosen to increase along the leading edge (20) towards the direction of rotation (R), and the length (Z0) being normalized along the axis of rotation (Z).

2. The turbine wheel according to claim 1, in which the plurality of curvatures (30, ..., 38) are formed to begin at the transition between the blade (12) and the hub (16) and continue until an outer edge (28) of the blade (12).

3. The turbine wheel according to claim 2, in which said plurality of curvatures (30, ..., 38) are chosen to be spaced at equal distances.

4. The turbine wheel according to claim 2, in which said plurality of curvatures (30, ..., 38) are chosen to be in the center of the blade (12).

5. The turbine wheel according to claim 1, in which the angle (T) of the associated curvature (30) initially increases at the transition between the blade (12) and the hub (16), has its maximum (40) in the region of 40% to 50% of the length (Z0), and then decreases.

6. The turbine wheel according to claim 1, in which the angles (T) of the curvatures (32, 34, 36) situated between the curvature (30) at the transition between the blade (12) and the hub (16) and the curvature (38) at the outer edge (28) have less pronounced maxima (40') than the maximum (40).

7. The turbine wheel according to claim 6, in which the angles (T) of the associated curvatures (32, 34, 36) have their respective maximum (40') in the region of 20% to 40% of the length (Z0).

8. The turbine wheel according to claim 6, in which the maxima (40') for adjacent curvatures (32, 34, 36) transition into a plateau in the direction of the outer edge (28).

9. The turbine wheel according to claim 1, in which the angles (T) of the curvatures (32, 34, 36) situated between the curvature (30) at the transition between the blade (12) and the hub (16) and the curvature (38) at the outer edge (28) each have a maximum in the form of a plateau.

10. The turbine wheel according to claim 1, in which the angle (T) of the associated curvature (38) remains constant or nearly constant along the outer edge (28) of the blade (12) in the region of up to 20% of the length (Z0), and then decreases so as to form the maximum (40") in the shape of a plateau.

11. The turbine wheel according to claim 1, in which the angle (T) of the associated curvature (38) along the outer edge (28) of the blade (12) has a maximum (40") in the region of less than 5% of the length (Z0).

12. A charging device with variable turbine geometry for use in an internal combustion engine, said charging device comprising a bearing housing (4) on a shaft (5), a compressor wheel (6), and a turbine wheel (10) that drives the compressor wheel (6) in an arrangement with variable turbine geometry, wherein the turbine wheel (10) comprises a plurality of blades (12) on a hub (16) that forms a rear wall (14), wherein adjacent blades (12) form an inlet surface (18) having two leading edges (20) and an outlet surface (22) having two trailing edges (24) and situated substantially axially inward, wherein a surface (26) of a blade (12) is configurable by way of an angle (T) and a length (Z0) of a plurality of curvatures (30, ..., 38) situated next to one another between the leading edge (20) and the trailing edge (24), wherein, for each of the curvatures (30, ..., 38), the angle (T) of the leading edge (20) initially increases or remains constant and then decreases as the length (Z0) increases so as to form a maximum (40, 40', 40").

* * * * *